United States Patent [19]

Lutz

[11] Patent Number: 4,808,678

[45] Date of Patent: Feb. 28, 1989

[54] POLYMER BLEND OF CARBON MONOXIDE/OLEFIN COPOLYMER AND A HYDROXYALKYL ETHER

[75] Inventor: Robert G. Lutz, Santa Rosa, Calif.

[73] Assignee: Shell Oil Company, Houston, Tex.

[21] Appl. No.: 205,972

[22] Filed: Jun. 13, 1988

[51] Int. Cl.$^4$ .................. C08G 67/02; C08F 283/00
[52] U.S. Cl. .................................. 525/529; 525/534; 525/539; 525/391; 528/392
[58] Field of Search ............... 525/529, 534, 539, 391

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,137,382 | 1/1979 | Vetter, Jr. | 525/529 |
| 4,157,428 | 6/1979 | Hammer | 525/529 |
| 4,424,317 | 1/1984 | Serres et al. | 528/392 |

FOREIGN PATENT DOCUMENTS

| | | |
|---|---|---|
| 121965 | 8/1984 | European Pat. Off. . |
| 181014 | 5/1986 | European Pat. Off. . |
| 213671 | 3/1987 | European Pat. Off. . |
| 1081304 | 9/1967 | United Kingdom . |

*Primary Examiner*—Harold D. Anderson
*Assistant Examiner*—T. Mason

[57] ABSTRACT

Blends of, as a major component, a linear alternating polymer of carbon monoxide and at least one ethylenically unsaturated hydrocarbon and, as a minor component, a polymeric, predominantly linear, hydroxyalkyl ether of bis(hydroxyphenyl)alkane, exhibit improved processability and oven life.

7 Claims, No Drawings

POLYMER BLEND OF CARBON MONOXIDE/OLEFIN COPOLYMER AND A HYDROXYALKYL ETHER

FIELD OF THE INVENTION

This invention relates to an improved polymer blend comprising predominantly a linear alternating polymer of carbon monoxide and at least one ethylenically unsaturated hydrocarbon. More particularly, it relates to blends of the linear alternating polymer and a polymeric, predominantly linear, hydroxyalkyl ether of a bis(hydroxyphenyl)alkane.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium salts as catalyst. Nozaki extended this process to prepare linear alternating polymers by the use of arylphosphine complexes of palladium moieties and certain inert solvents. See, for example, U.S. Pat. No. 3,964,412.

More recently the class of linear alternating polymers of carbon monoxide and at least one ethylenically unsaturated hydrocarbon has become of greater interest because of the greater availability of the polymers in quantity. These polymers, often referred to as polyketone polymers or polyketones, have been shown to be of the repeating formula —CO—(A)— wherein A is the moiety of ethylenically unsaturated hydrocarbon polymerized through the ethylenic unsaturation. By way of further illustration, when the unsaturated hydrocarbon is ethylene, the polymer will be represented by the repeating formula —CO—(CH$_2$—CH$_2$)—. The general process for the more recent preparation of such polymers is illustrated by a number of European Patent Applications including Nos. 121,965 and 181,014. The process typically involves the use of a catalyst composition formed from a Group VIII metal selected from palladium, cobalt or nickel, a strong non-hydrohalogenic acid and a bidentate ligand of phosphorus, arsenic or antimony.

The resulting polymers are relatively high molecular weight thermoplastics having established utility in the production of shaped articles such as containers for food and drink and internal and external parts for the automotive industry. Such articles are produced by processing of the polymers by conventional methods. For some particular applications it has been found desirable to have properties for a polymeric composition which are somewhat different from those of the polyketone polymers. It would be of advantage to retain the more desirable properties of the polyketone polymer and yet improve other properties. These advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon with certain other polymeric material. More particularly, according to the invention, there are provided blends of the linear alternating polymer and polymeric, predominantly linear, hydroxyalkyl ether of bis(hydroxyphenyl)alkane. Such blends are characterized by improved processability and oven life.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, 1-hexene, 1-octene and 1-dodecene, or are arylaliphatic containing an aromatic substituent on an otherwise aliphatic molecule, particularly an aryl substituent on a carbon atom of the ethylenic unsaturation. Illustrative of this latter class of ethylenically unsaturated olefins are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymer is that of a linear alternating polymer of carbon monoxide and at least one ethylenically unsaturated hydrocarbon and the polymer will contain substantially one molecule of carbon monoxide for each molecule of hydrocarbon. When terpolymers of carbon monoxide, ethylene and a second hydrocarbon are employed in the blends of the invention, there will be at least two units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain is therefore represented by the repeating formula

wherein G is the moiety of unsaturated hydrocarbon of at least 3 carbon atoms polymerized through the ethylenic unsaturation. The —CO—(CH$_2$—CH$_2$)— units and the —CO—(G)— units are found randomly throughout the polymer chain and the ratio of y:x will be no more than about 0.5. In the modification where copolymers of carbon monoxide and ethylene are employed in the blends of the invention, there will be no second hydrocarbon present and the polymer will be represented by the above formula wherein y is 0. When y is other than 0, i.e., terpolymers are employed, ratios of y:x from about 0.01 to about 0.1 are preferred. The end groups or "caps" will depend on what materials were present during the preparation of the polymer and whether and how the polymer was purified. The precise properties of the polymers will not depend upon the particular end groups to any considerable extent so that the polymer is fairly represented by the above formula for the polymer chain. Of particular interest are the polymers of number average molecular weight from about 1,000 to about 200,000, particularly those of number average molecular weight from about 20,000 to about 90,000, as determined by gel permeation chromatography (GPC). The physical properties of the polymers will depend in part on the molecular weight, whether the polymer is a copolymer or a terpolymer and, in the case of terpolymers, the relative proportion of the second hydrocarbon present. Typical melting points for such polymers are from about 175° C. to about 300° C., more frequently from about 210° C. to about 270° C. The polymers have limiting viscosity numbers (LVN), when measured in a standard capillary viscosity measuring device in m-cresol at 60° C., of from about 0.4 to about 10, preferably from about 0.5 to about 4.

Polymerization is conducted in the gas phase in the substantial absence of reaction diluent or in a liquid phase in the presence of an inert reaction diluent such as an alkanol, e.g., methanol or ethanol. The reactants are contacted under polymerization conditions in the presence of the catalyst composition by conventional methods such as shaking or stirring in a suitable reaction vessel. Typical reaction temperatures are from about 20° C. to about 150° C., more frequently from about 50° C. to about 135° C. Suitable reaction pressures are from about 1 bar to about 200 bar, preferably from about 10 bar to about 100 bar. Subsequent to reaction, the polymer is recovered as by filtration or decantation. The polymer product may contain residues of the catalyst composition which are removed, if desired, by treatment with a solvent or a complexing agent which is selective for the residues.

The minor component of the blends of the invention is a polymeric, predominantly linear, hydroxyalkyl ether of a bis(hydroxyphenyl)alkane. It is well known in the art that bis(hydroxyphenyl)alkanes react with an epihalohydrin, e.g., epichlorohydrin, or with the corresponding bis(glycidyloxyphenyl)alkane to produce polymeric, linear ethers wherein the polymer is an alternating polymer of bis(oxyphenyl)alkane moieties and 2-hydroxypropane moieties, capped or terminated with glycidyl groups. By way of illustration, a low molecular weight polymer or oligomer, of 2,2-bis(4-hydroxyphenyl)propane and epichlorohydrin, or 2,2-bis(4-glycidyloxyphenyl)propane, is of the general formula

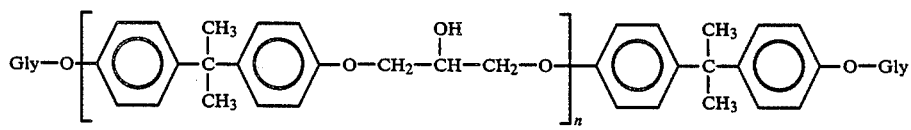

wherein Gly is glycidyl. The term n is a number indicating the number of units in the low molecular weight polymer less the one additional indicated unit. The production of such low molecular weight polymers is also well known in the art. In one embodiment, the bis(hydroxyphenyl)alkane reacts with an excess of epichlorohydrin in the presence of a stoichiometric quantity of a strong alkali metal base, e.g., sodium hydroxide. In an alternate reaction scheme, the bis(hydroxyphenyl)alkane reacts with a bis(glycidyloxyphenyl)alkane to produce the low molecular weight polymer. The molecular weight of the polymer, and thus the term n, is determined by the ratio of reactants as well as the reaction conditions employed. A typical value of n will be from about 4 to about 40, although it should be understood that not all polymer molecules will have the same number of units and thus n will be an average and not necessarily a whole number. Such low molecular weight polymers tend to be almost entirely linear. Without wishing to be bound by any particular theory, it appears likely that the phenolic hydroxyl groups of the bis(hydroxyphenyl)alkane react preferentially with the glycidyl groups present because of the greater acidity of the phenolic hydroxyl groups as compared to the aliphatic hydroxyl of the 2-hydroxypropyl moieties which are produced.

In contrast, the polymeric, predominantly linear, hydroxyalkyl ethers of bis(hydroxyphenyl)alkanes of the invention have a higher molecular weight, typically in the range of from about 20,000 to about 200,000 but preferably in the range of from about 25,000 to about 45,000, and have a small but significant proportion of branching. The polymeric, predominantly linear, ethers of the invention are known as is the general method of their production. The bis(hydroxyphenyl)alkane is reacted with an excess of the corresponding bis(glycidyloxyphenyl)alkane in a liquid reaction environment in the presence of a reaction diluent and at elevated temperature and pressure. A quaternary ammonium hydroxide is often added as a catalyst for the condensation reaction. As the molecular weight of the polymer increases, the proportion of 2-hydroxyalkane moiety in the polymer increases as does the likelihood of reaction between the aliphatic hydroxyl and a glycidyl moiety, possibly because of a mass law effect. Condensation by way of reaction of a 2-hydroxyalkane hydroxyl and a glycidyl moiety leads to branching in the predominantly linear hydroxylakyl ethers employed in the invention. The ethers are predominantly linear, with generally no more than about 10% of the polymerization taking place through branching so that the polymeric, predominantly linear hydroxyalkyl ether of the bis(hydroxyphenyl)alkane is at least about 90% linear.

The hydroxyalkyl ethers employed as the minor component of the blends of the invention are suitably produced from bis(hydroxyphenyl)alkanes wherein the alkane moiety is alkane of up to 8 carbon atoms inclusive and each phenyl ring has up to 4 additional ring substituents which are inert under the conditions of the reaction to produce the ethers. Such substituents include alkyl, preferably lower alkyl of up to 4 carbon atoms inclusive or halo, preferably the middle halogens chloro or bromo. Illustrative of such bis(hydroxyphenyl)alkanes are 2,2-bis(4-hydroxyphenyl)propane (bisphenol acetone or BPA), 4,4-bis(3-hydroxyphenyl)octane; bis(4-hydroxy-3-methylphenyl)methane, 3,3-bis(3-hydroxy-4-chlorophenyl)heptane and 2,2-bis(4-hydroxy-3,5-dibromophenyl)propane. The preferred polymeric predominantly linear hydroxyalkyl ethers are produced from 2,2-bis(4-hydroxyphenyl)propane and 2,2-bis(4-glycidyloxyphenyl)propane and are therefore 2-hydroxypropyl ethers of 2,2-bis(4-hydroxyphenyl)propane. Such ethers are known and certain of the ethers are commercial, for example, those ethers marketed by Shell Chemical Company under the trademark EPANOL ® Resins.

The blends of the invention comprise a mixture of a major proportion of the polyketone polymer and a minor proportion of the polymeric, predominantly, linear hydroxyalkyl ether of bis(hydroxyphenyl)alkane. The precise proportion of the polymeric ether component is not critical and amounts of polymeric ether component in the blend from about 0.5% by weight to about 45% by weight, based on total blend, are satisfactory. Amounts of polymeric ether component in the blend from about 1% by weight to about 20% by weight, on the same basis, are preferred.

The method of producing the blend of the polyketone polymer and the polymeric, predominantly linear, hydroxy ether of bis(hydroxyphenyl)alkane is not material so long as a relatively uniform distribution of the polymeric ether component throughout the polyketone polymer is obtained. The polyketone/polymeric ether blend is a substantially non-miscible blend with the polymeric ether component existing as a discrete phase in the polyketone matrix having a phase size of from about 0.1 micron to about 0.4 micron, more typically on the order of about 0.25 micron. In part because of the relatively small phase size of the polymeric ether phase, it is difficult to determine whether any substantial amount of miscibility exists between the two blend components. It is evident from examination of a typical blend, however, that the blend is an at least predominantly non-miscible blend. The blend is not homogeneous, but good results are obtained when the distribution of the polymerized ether component throughout the polyketone matrix is substantially uniform. The method of blending the components is that which is conventional for the blending of non-miscible polymeric materials. In one modification, the components in particulate form are mixed and passed through an extruder operating at high RPM to produce the blend as an extrudate. In an alternate modification the components are blended in a mixing device which exhibits high shear.

The blends of the invention may also contain conventional additives such as antioxidants, stabilizers, fillers, fire retardant materials, mold release agents and other substances which improve the processability of the polymeric components or modify the properties of the resulting blend. Such additives are added prior to, together with or subsequent to the blending of the polyketone polymer and the polymeric ether.

The blends of the invention are characterized by improved processability and oven life as compared with the polyketone polymer, in part because of the good interfacial adhesion between the dispersed polymeric ether and the polyketone matrix. The blends are of particular utility where production of articles involving molten polymer are employed or when a shaped article is to be utilized under conditions where elevated temperatures are likely to be encountered. The blends are processed by conventional techniques such as extrusion and injection molding into sheets, films, plates and shaped articles which are useful in packaging applications, in the production of containers as for food and drink and in the production of external as well as internal parts for automotive applications.

The invention is illustrated by the following Illustrative Embodiments which should not be construed as limiting.

Illustrative Embodiment I

A linear alternating terpolymer of carbon monoxide, ethylene and propylene was prepared in the presence of a catalyst composition formed from palladium acetate, the anion of trifluoroacetic acid and 1,3-bis(diphenylphosphino)propane. The melting point of the terpolymer was 225° C. and the terpolymer had a limiting viscosity number (LVN), measured in m-cresol at 60° C., of 1.72.

Illustrative Embodiment II

A blend of the polyketone polymer of Illustrative Embodiment I and 9.7% by weight, based on total blend of a polymeric predominantly linear hydroxyalkyl ether of 2,2-bis(4-hydroxyphenyl)propane was produced. The polymeric ether had a molecular weight of approximately 80,000 and a glass transition temperature of 100° C. The polyketone polymer, the polymeric ether and approximately 0.2% by weight based on total polymer of Irganox 1076, a conventional hindered phenolic antioxidant to provide background stabilization, were processed through a 15 mm twin screw Baker Perkins extruder. The extruder temperature was 240° C. operating with undried feed and under a nitrogen blanket. The extruder was operated at maximum RPM to produce a residence time of 0.5 minutes and the extruded strands were passed directly into water. Feed rate through the extruder for the blend was substantially higher than feed rate for the polyketone polymer in the absence of the polymeric ether. The resulting polymeric blend was non-miscible as evidenced by examination of cold cut samples, stained with ruthenium tetroxide, under an electron microscope. The polymeric ether was present as a discrete phase having a particle diameter approximately 0.25 micron in diameter.

Illustrative Embodiment III

A second blend was produced by the procedure of Illustrative Embodiment II except that no Irganox 1076 was added beyond a small amount introduced during the production of the terpolymer. Small plaques of the polyketone polymer and the polyketone/polymeric ether blend were produced and placed in an oven at 100° C. The samples were flexed periodically to determine the number of days to embrittlement. Samples of the polyketone polymer survived the test, i.e., did not become brittle, for 9 days. A sample of the polyketone/polymeric ether blend survived for 10 days.

What is claimed is:

1. A composition comprising a non-miscible blend of, as a major component, a linear alternating polymer of carbon monoxide and at least one ethylenically unsaturated hydrocarbon and, as a minor component, a polymeric, predominantly linear, hydroxyalkyl ether of a bis(hydroxyphenyl)alkane.

2. The composition of claim 1 wherein the linear alternating polymer is of the repeating formula $$+CO-(CH_2-CH_2)_x+CO-(G)_y$$

wherein G is the moiety of an ethylenically unsaturated hydrocarbon of at least 3 carbon atoms polymerized through the ethylenic unsaturation and the ratio of y:x is no more than about 0.5.

3. The composition of claim 2 wherein the minor component is a polymeric, predominantly linear, hydroxyalkyl ether of a bis(hydroxyphenyl)alkane, said polymeric ether having a molecular weight from about 20,000 to about 200,000 and no more than about 10% branching.

4. The composition of claim 3 wherein the ether is a 2-hydroxypropyl ethyr of 2,2-bis(4-hydroxyphenyl)propane.

5. The composition of claim 4 wherein y is 0.

6. The composition of claim 5 wherein G is a moiety of propylene.

7. The composition of claim 6 wherein the ratio of y:x is from about 0.01 to about 0.1.

* * * * *